(12) United States Patent
Pearson

(10) Patent No.: US 7,314,407 B1
(45) Date of Patent: Jan. 1, 2008

(54) VIDEO GAME SYSTEM USING TRADING CARDS

(76) Inventor: Carl P. Pearson, 16311 75th Pl. West, Edmonds, WA (US) 98026

( * ) Notice: Subject to any disclaimer, the term of this patent is extended or adjusted under 35 U.S.C. 154(b) by 600 days.

(21) Appl. No.: 09/669,087

(22) Filed: Sep. 25, 2000

(51) Int. Cl.
A63B 13/00 (2006.01)

(52) U.S. Cl. .............................. 463/7; 463/42; 463/29

(58) Field of Classification Search ................ 235/492, 235/375, 487; 463/42, 29, 7–9, 25; 705/1; 380/4
See application file for complete search history.

(56) References Cited

U.S. PATENT DOCUMENTS

| | | | | |
|---|---|---|---|---|
| 5,212,368 | A * | 5/1993 | Hara ........................... | 235/375 |
| 5,411,259 | A * | 5/1995 | Pearson et al. ............... | 463/42 |
| 5,533,124 | A * | 7/1996 | Smith et al. .................... | 380/4 |
| 5,662,332 | A * | 9/1997 | Garfield ....................... | 273/308 |
| 5,689,561 | A * | 11/1997 | Pace .............................. | 380/4 |
| 5,748,731 | A * | 5/1998 | Shepard ......................... | 380/4 |
| 5,938,726 | A * | 8/1999 | Reber et al. ................. | 709/217 |
| 5,939,699 | A * | 8/1999 | Perttunen et al. ...... | 235/462.01 |
| 5,986,651 | A * | 11/1999 | Reber et al. ................. | 345/335 |
| 6,061,656 | A * | 5/2000 | Pace .............................. | 705/1 |
| 6,200,216 | B1 * | 3/2001 | Peppel .......................... | 463/1 |
| 6,322,077 | B1 * | 11/2001 | Braunlich ................... | 273/292 |
| 6,325,292 | B1 * | 12/2001 | Sehr ........................... | 235/492 |
| 6,398,651 | B1 * | 6/2002 | Yamada ........................ | 463/43 |
| 6,468,162 | B1 * | 10/2002 | Nakamura .................... | 463/43 |
| 6,546,400 | B1 * | 4/2003 | Aberson .................... | 707/104.1 |
| 6,601,851 | B1 * | 8/2003 | Sakamoto et al. .......... | 273/308 |
| 2001/0056383 | A1 * | 12/2001 | Shuster ......................... | 705/27 |
| 2002/0052238 | A1 * | 5/2002 | Muroi ......................... | 463/40 |

FOREIGN PATENT DOCUMENTS

| | | | |
|---|---|---|---|
| GB | 2331378 | * | 5/1999 |
| JP | 05253335 | * | 10/1993 |
| JP | 05307634 | * | 11/1993 |
| JP | 05337251 | * | 12/1993 |
| JP | 06071049 | * | 3/1994 |
| JP | 06325191 | * | 11/1994 |

* cited by examiner

Primary Examiner—John M. Hotaling, II
(74) Attorney, Agent, or Firm—Jensen & Puntigam, P.S.

(57) ABSTRACT

The trading card/video game system includes a conventional video game control system for a selected video game involving a number of different characters. The video game control system controls a monitor/screen for displaying the playing of the game. Trading cards are selected by the individual players for playing of the game. Each trading card is a character having selected characteristics and abilities, or a specialty card which affects the characters in the game or the conditions of the game, including the rules. The individual selected trading cards are scanned and the information associated with the trading cards is downloaded from a website database to which the system is connected via the internet to the software control system portion of the system. The website has a number of capabilities with respect to the individual trading cards, including verification of authenticity and ownership of the cards and a capability of assisting in the trading, temporary use, sale or acquisition of trading cards.

22 Claims, 2 Drawing Sheets

VIDEO GAME SYSTEM USING TRADING CARDS

TECHNICAL FIELD

This invention relates generally to video game systems, and more specifically concerns a video game system in which trading cards are used in the playing of the video game.

BACKGROUND OF THE INVENTION

Video games are well known in the home entertainment industry. Within this general field, there exists numerous interactive sports games, including baseball, football, basketball, soccer and other sports, and a large number of fantasy and adventure games.

The "rules" governing the play of such video games, as well as the characteristics, abilities and other features of each of the characters in the games, are maintained in the software control system portion of the game. The characters include actual sports and action figures as well as fantasy figures. The software control system controls a display, such as a TV monitor, as the game is played. Typically, the characteristics of the individual characters (whether they be actual characteristics or fantasy) are established in the software and cannot be changed.

Board games are also well known in the home entertainment industry. The individual characters used in board games have certain well-defined characteristics which are set forth in the rules of the game. The characters are moved about in accordance with a roll of the dice, a spinner or similar element. The capabilities of the characters cannot be changed by the players.

Trading cards are another well-known entertainment medium; trading cards typically feature sports figures, but can certainly include characters in other fields as well, including fictional/fantasy characters such as Pokemon characters. Trading cards typically contain information about the actual sports figure or other character featured on the cards. The value of trading cards is dependent upon the rarity of the cards. In some instances, there has been a crossover between trading cards and board games; and in at least one case, as disclosed in U.S. Pat. No. 5,411,259, which is owned by the assignee of the present invention, trading cards have been used as the informational basis for a sports-based video game in which each player selects a team based on the trading cards they possess. Information concerning the player featured on each of the cards used in the game is provided to the software control system and the game is then played, using the performance information on the selected cards.

Hence, trading cards have not only inherent value when considered as individual cards, or as part of a collection, but also can be used as a part of a video game, in particular a video game which involves a set of characters selected by each player in turn.

However, it is understood that there are significant limitations on such known systems. For instance, there are limitations on the use of trading cards in the video game. Further, in some games, it is important to be able to authenticate the ownership of the trading cards prior to starting the game, as well as a desire to be able to register the trading cards with a central organization, so that the cards may be readily bought and sold, even during the playing of the game, which would add to the players' ability to affect the game being played. Current systems do not have such capability.

There is also the desire to expand the trading card concept into games beyond sports and individual players into fantasy and/or adventure games. It would in some cases be desirable to have the capability of affecting the rules and/or other conditions of the game during the playing of the game, as well as the capability of affecting the abilities and characteristics of the characters actually in the game, such as by the possession or acquisition and subsequent playing of selected additional trading cards. In such an instance, the core value or features of the game remain, but certain aspects thereof are enhanced.

Still further, in some cases, it is desirable to maintain trading cards used in a game in a "mint" or even uncirculated condition, either by the player or by another entity, so that the value of the card is maintained even though the card is used to play the game. In general, it is desirable to expand the ability, flexibility and use of trading cards in the video game context.

DISCLOSURE OF THE INVENTION

Accordingly, the present invention is a video game system using trading cards, comprising: an electronic game system for use with a video screen for displaying the playing of a video game featuring characters on trading cards, the characters having associated character information, including characteristics which define the playing of the game, the electronic game system including a control system for carrying out the video game and controlling the display on the screen in accordance with a stored software program and in accordance with the character information associated with the trading cards selected by the players of the game for use in the game; trading cards having characters indicated thereon for playing the video game; means for identifying the trading cards selected by players for playing the video game; means for connecting the electronic game system to a website through a global computer network; and means for verifying that the players have the right to use the selected trading cards in the playing of the video game, wherein the website stores information associated with the characters in said trading cards and downloads said information to the video game control system, after the trading cards have been identified and verified, for playing of the video game.

BEST MODE FOR CARRYING OUT THE INVENTION

Figure 1:
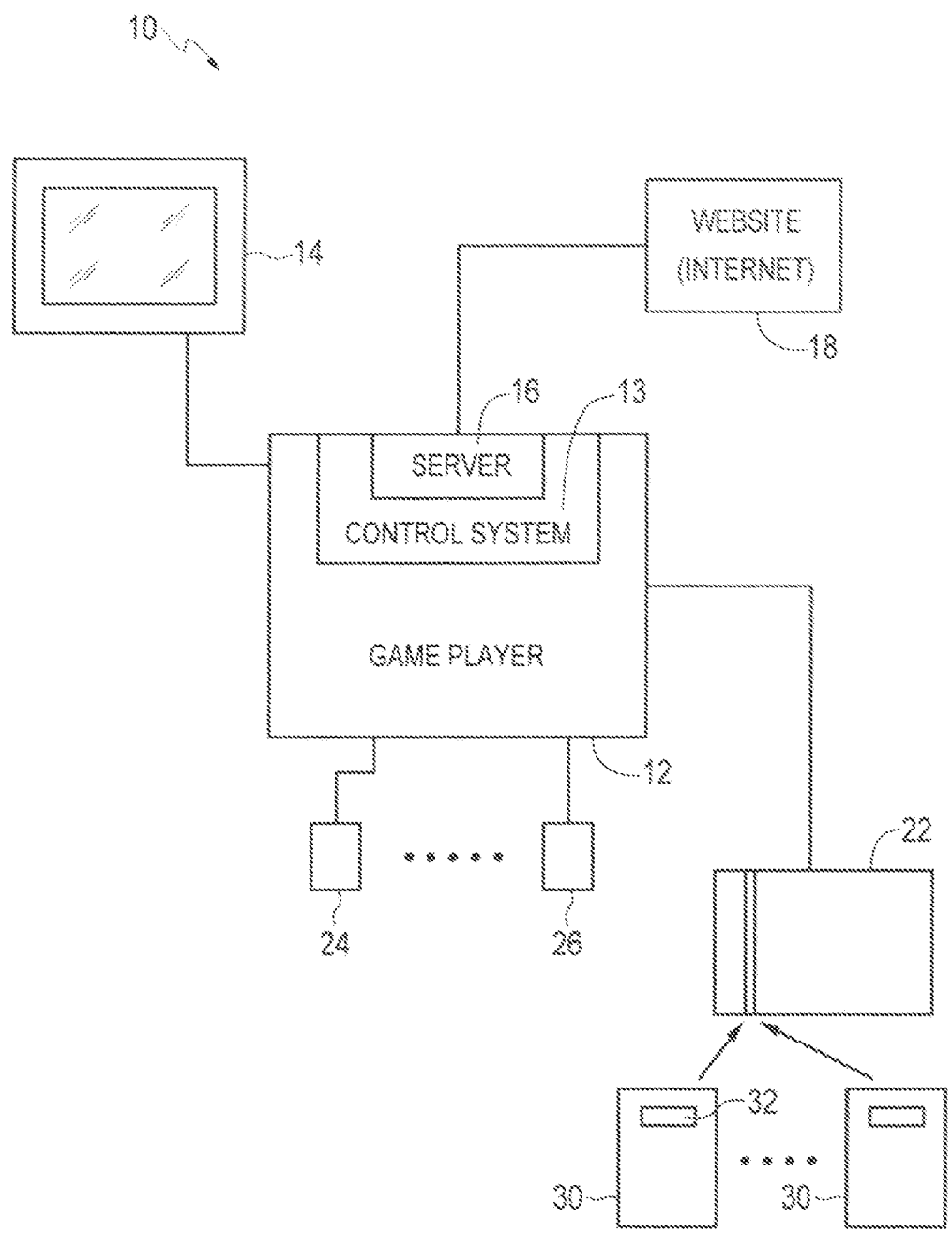
FIG. 1 is a block diagram showing the basic components of the system of the present invention.

The video game system of the present invention, referred to generally at 10, includes a video game player 12 which includes video game software 13, hereinafter referred to simply as a software control system or sometimes just control system. The video game player 12 will include a "thin" server, such as a PDA, for connection to the internet. The control system 13 is not discussed in detail, since it is conventional, i.e. similar control systems for various video games are well known. The system of the present invention will in fact utilize existing video game software, enhanced so as to permit the use of trading cards. Control system 13 controls and maintains the display of the game as it is being played on a monitor, such as a conventional television monitor 14. In the operation of the present system, monitor 14 will display the individual trading cards to be used in a particular game, as well as displaying the game as it is carried out with the information associated with the characters selected by the individual players and provided in the form of trading cards owned/controlled by the players.

As indicated above, video game player 12 with software control system 13 is connectable to the internet, via a server 16. The video game player 12 can be a computer, a handheld portable device such as a PDA or even a cell phone. The server 16 with its included browser will be able to connect to the internet and locate a system website 18, which plays a significant role in the system of the present invention. Briefly, website 18 in one embodiment includes a database which contains all of the information concerning the characteristics and abilities associated with each playing card character, as well as information concerning other playing cards used in the game; the information in the website database can be downloaded to the software control system.

While the software control system to run the game is shown separately at 13 in FIG. 1, the software could also be present at the website 18 itself. Also, while monitor 14 is shown separate from the game player 12, display 14 could be a computer display, a cell phone display or other portable device with a screen. Such a device would include a server with a browser ability to reach website 18.

Website 18 can be accessed by a player for a variety of functions associated with the trading cards, apart from the playing of the game, including registration of the trading cards, selling, purchasing and renting additional trading cards on-line, and verifying ownership of the cards selected by a player for a game. With respect to the game itself, besides downloading data about individual characters, website 18 can alter the rules and other characteristics of the game through the use of specialty game cards played during the game. Other functions of the website are discussed below and/or can be ascertained by one of ordinary skill in the art. More than one website may be involved and accessed by the players relative to the game and/or the trading cards.

The embodiment of the present invention shown in FIG. 1 also includes a card scanner 22, the output of which is applied to the video game player 12. The purpose of scanner 22 is to identify the particular cards selected by the players for the playing of the game. The information from scanner 22 will be provided to website 18 server by the video game software control system 13. When the website server verifies ownership of the card, information about the character represented on the scanned trading card is downloaded from the website database to the control system 13, where it is stored for playing the game. Scanner 22 could be separate as shown or could be built into the video game player 12, such as a miniature bar code scanner.

In some cases, there may be no need for a scanner per se. The trading card to be identified could include a smart chip (updateable) which powers up in response to a signal from the game player 12. The smart chip then transmits the identity of the card to the game player. The trading card could also be a CD-ROM card which could be read by a CD player in the game player 12.

FIG. 1 also shows two control elements 24 and 26 which permit individual players to control the game, through the game player 12. The control elements 24 and 26 are conventional video game controls. It should be understood, however, that a large number of players for a game are possible, particularly through the internet connection where players could be in separate locations. The display could be the same on the screens of all the players or it could be different for each player (displaying only the player's cards) depending on the particular game being played.

A central part of the overall system of the present invention are the individual trading cards used in the game. An individual trading card, referred to generally at 30, will typically identify a particular character in a selected video game. It should be understood that all video games, whether they be fantasy/adventure or sports-based or for some other subject matter, are appropriate for use in the system of the present invention, as long as the games include individual characters and are appropriately modified to accommodate trading card media. The individual characters in the game are set forth on trading cards, which have separate utility and are produced, distributed and exchanged separate from the video game itself.

The trading cards can be obtained by the players in various ways. Actual cards themselves can be purchased or traded; cards can be obtained from other sources, such as magazines or food boxes, where the game developer could place them. Advertisers or the trading card provider could also place the cards or make them available in various ways to the public. The cards further could be facsimiles of real cards, including electronic facsimiles.

The trading cards, represented in FIG. 1 by trading cards 30-30, will typically have a picture or other representation of the character on the card, as well as information concerning the particular abilities and characteristics of the character, including the power and authority of the particular card in various circumstances relative to other characters of the game. This information can be on the card itself, or an identifier can be used on the card, which when transmitted to website 18 will result in website 18 downloading the relevant information from its database to the software control system 13. Both arrangements work satisfactorily in the present system.

The information on the cards can vary widely, but typically will feature a characteristic which is related to the playing of the game and which affects the manner in which the game is played. In addition to the "character" cards, other cards can be used. These include various specialty cards which when played can affect the abilities of various characters in the game, either enhancing the capability of one of the player's characters or reducing an opponent's character, or affecting other factors concerning circumstances of the game, or even the rules of the game. These specialty cards could also include product cards which affect the operation of selected aspects of the game. For instance, a gasoline (or other fuel) card could improve (or decrease) the performance of selected vehicles in the game.

The specialty cards are just like the character cards, except they affect the overall game itself, or a machine used in the game, or the characters in the game. Besides enhancing the performance of desired characters or decreasing performance of opponent's characters, the specialty cards could add special tools, weapons or other equipment, such as vehicles, which would aid the player's characters in the playing of the game. The product cards could also be such as to affect use of the tools, weapons and vehicles, etc. All the "specialty" information can be provided either on the card itself or can be downloaded from the website database in response to an identifying symbol on the specialty card.

The trading cards are identified by a unique indicia 32, such as a bar code. The bar code could be on the card itself, or on a case which holds and protects the card. The code identifies the card. The bar code could be placed on the card during the manufacturing process or at a later date or the code could be placed on the case/container during the manufacturing process or at a later date after the manufacture of the card. The case could be a hard container or a flexible, see-through plastic holder. The card character information could also be provided on the clear container. The indicia is used to identify and verify the cards prior to playing of the game, as explained in more detail below.

A significant feature of the system of the present invention involves the ability of the system to access a website 18 for information concerning the various trading cards, as well as various on-line functions involving the trading cards. As indicated above, the software control system 13 could be at the website 18 as well. New trading cards for a particular video game that are purchased from authorized dealers or a factory source may be registered as mint or "uncirculated" and stored, i.e. vaulted, by the dealer or factory. This can be done through website 18 or the website of a dealer or the factory. The purchaser of the trading card receives rights to use an electronic facsimile, or similar replica, of the actual purchased card for playing the video game, as well as the right to display the replica card in collections and the like. The actual uncirculated card can be sold, traded or loaned through the website facility.

Collectors of trading cards can also have their existing cards graded and certified by authorized dealers. The dealers can obtain appropriate code information for individual cards from the website 18. This information is then provided to the website 18. The owner may retain physical possession of the card or elect to have it stored by an authorized dealer. A facsimile or replica can be used in the playing of the game, just as for mint or uncirculated cards. The original card could be used in the card case/container.

There could also be premier or special editions of trading cards for games in which a limited number of cards (or even a single card) could be produced for each character in the game. Such a card would include a unique identifying number or feature. The card would then be registered to the actual owner at website 18. Various means could be used, including a PIN number or a fingerprint, to identify the owner of the card. Registration of the card at website 18 would ensure against counterfeit cards and protect the purchaser's investment.

Collectors may also have their trading cards registered by an authorized dealer or may register the cards themselves by entering an identification number that has been provided by the card manufacturer or an authorized dealer. This again can be done through website 18. In each case, the owner of the card will receive the right to use a facsimile or replica of the actual card for playing of the video game. The owner can retain possession of the real card or have it stored by a factory or authorized dealer.

With such a system of validation and registration available through the website, registered cards can be conveniently selected for a portfolio of cards which can be readily valued and made available for sale. Individual cards in a particular portfolio may also be sold or traded on-line. Stored (vaulted) cards in uncirculated condition which are sold or traded may be delivered physically to the new owner or the change in ownership can be carried out through the registration process.

Registered cards can also be made available for temporary use, such as during a game, without change of ownership of the cards. Cards can be made available through the website, even during the playing of a particular game, as will be discussed hereinafter. In addition to the individual cards, various series or collections of cards may be used and/or acquired in the same way that individual cards are used, in accordance with the rules of each video game.

Users/players furthermore may make their collections available on-line for private viewing or even make them available to the public.

Hence, the system of the present invention accommodates a wide variety of features concerning various aspects of the use of trading cards, in addition to use of trading cards in playing a video game. The features not only enhance the value of the individual cards such as through registration and/or vault/storage, but facilitate a trading market for the cards, as well as increasing the overall flexibility, complexity and enjoyment of the video game.

Figure 2:
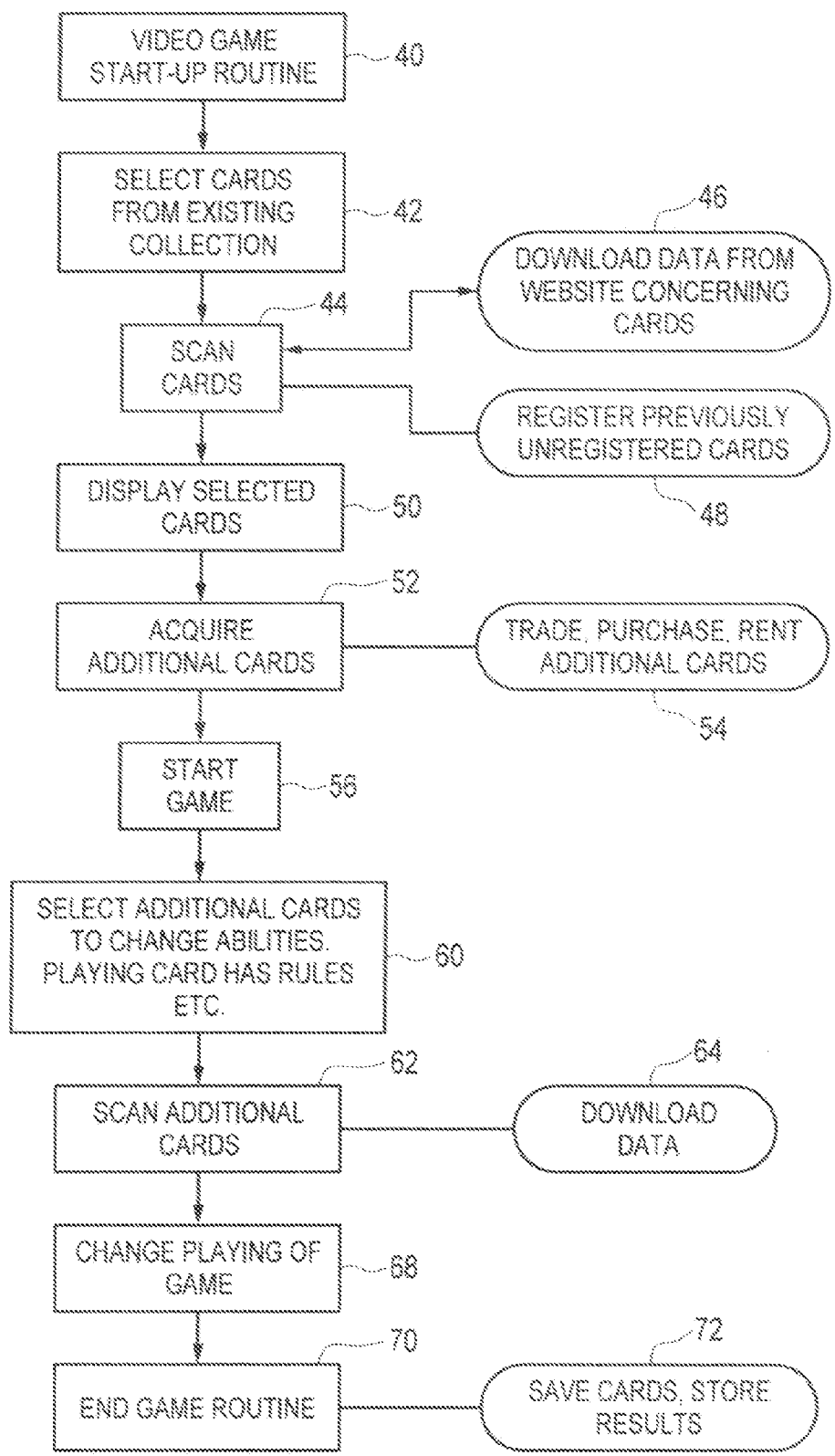
FIG. 2 is a flowchart showing the sequence of operations of the system of the present invention.

FIG. 2 shows in general the operational steps of the system of the present invention used for playing the video game with the trading cards. Initially, the video game software goes through its conventional start-up routine, as shown in block 40. The individual players in the game select particular cards from their existing collection of trading cards for the particular video game to be played. The number of players may vary widely from one to several, to perhaps thousands on the web, depending on the particular video game. Each of the cards selected by a player for the game must in fact be owned by the player or the player must have the right to use the card. In some games, a large number of cards, in fact several hundred, are possible, although only a selected number of cards can be used in playing the game. While typically each card used in starting the game will be identified, it is possible in some cases that a single identification and verification of ownership will be used for a portion or even all of one team or group of cards.

Thus, selection of particular cards, with each character card having unique abilities and characteristics for the game and relative to the other characters, and the total number of cards in the player's collection, are both important parts of success of the playing of the game. Obviously, the more complete the collection of cards a particular player has, the more varied the possibilities there are for the individual player in the selection of characters to start the game. The step of selecting the cards by the player to start the game is shown in block 42.

The individual player may have physical possession of the actual card or, as explained above, the card may be a replica or facsimile of the actual card, which is either stored by the user (so as not to use the actual card) or stored by some other entity such as an authorized dealer or the factory. The card could also be in a case or container to protect the card.

The individual cards or facsimiles which are used to begin play are then scanned, as shown in block 44. As explained above, the scanner may be a separate unit or may be a part of another portion of the system. In some cases, scanning is not necessary, as an indicia on the card or its container can simply be entered by the player along with a PIN number identifying the player.

With this information, the system can identify the card and verify ownership of the card by the player, two key aspects of the overall game. When a scanner is used and the individual cards have been scanned, information obtained from the scanning process, such as an identifying code, is provided to the website 18, which will first verify ownership of the scanned card in the player selecting the card, and then will download data from the website database concerning the scanned card into the software control system 13, as indicated at block 46.

The downloaded data includes all of the characteristics and other information associated with the scanned card, whether it be for a character or special effects or other card, such as those affecting the rules or circumstances of the game or those affecting a machine or other aspect of the game. The scanning of the card also can be used to automatically produce a registration at the website 18 of a previously unregistered card, as shown in block 48. For instance, if a particular card has just been purchased by a player, or for some other reason has not been previously registered, registration can occur either at a prior request of the player or automatically when the card is first used in a game.

In a game which does not include website 18 or the internet, all of the information about the character, etc. which is the subject of the card is contained on the card, or alternatively, accessed in local memory by the pin number on the card. This information is directed to memory associated with the software control system to play the game.

At this point, after the cards selected by the players have all been identified and ownership verified and the information associated with the cards has been provided to the control system 13, the selected cards are displayed on the monitor 14, as shown at block 50, in accordance with the rules of the game. At this point, the players may be aware of some of the cards selected by their competitors. Other cards may remain hidden from competitor's view. This will be the case where the game is played via the internet. There is at this point in the game an opportunity for individual players to acquire additional or substitute cards for the game, either from their own collection or through some other source, such as a purchase or trade through website 18 or other source, from which new cards can be purchased, traded for or temporary use rights obtained. The opportunity to obtain additional cards gives each player the capability to combat the characters, products, etc. of the opposing players. Again, the internet aspect provides the flexibility for the trading card video game to be played in a unique and dynamic manner. The acquisition of additional cards is shown at block 52, while the internet functions concerning trade, purchase or obtaining temporary use of selected cards are shown at block 54.

The actual game is then started, as shown at block 56, and played in accordance with the rules for the video game established in the software control system. After the game has begun, additional cards can again be selected by each player. The additional cards can add or subtract characters, or they can be specialty cards to change the abilities of the characters already in the game, or to change the playing conditions or rules of the game. This is shown at block 60.

The additional cards are scanned at block 62, just like for block 44, and information downloaded online, as shown at block 64. The software control system then changes the overall characteristics of the characters, other aspects of the game and/or the video game rules accordingly and the playing of the game continues, as shown at block 68. This process loops back on itself during the game as the game continues. When the game is completed, an end-game routine occurs, as shown in block 70. The results of the game and/or the cards used in the game can then be saved for future use or awarding of prizes or benefits. This is shown at block 72.

Hence, a trading card/video game system has been disclosed which includes an internet website capability for not only enhancing the overall game through its information and control capability, but also increases the value and marketability of the individual cards used in the game, such as through registration and a transactional capability.

Although a preferred embodiment of the invention has been disclosed here for purposes of illustration, it should be understood that various changes, modifications and substitutions may be incorporated in the preferred embodiment without departing from the spirit of the invention, which is defined by the claims which follow.

What is claimed is:

1. A video game system using trading cards, comprising:
a local electronic game system for use with a video screen for displaying the playing of a selected video game featuring characters on trading cards, the characters having associated character information, including characteristics which define the playing of the game, the electronic game system including a control system for carrying out the video game and controlling the display on the screen in accordance with a stored software program and in accordance with the character information associated with the trading cards selected by the players of the game for use in the game;
trading cards having characters indicated thereon for playing the video game;
an identification system for identifying the trading cards selected by players for playing the video game;
a server control unit for connecting the local electronic game system to a website at a remote location through a global computer network; and
a processing system at the website for verifying that the players of the video game have the right to use the selected trading cards in the playing of the selected video game, wherein the website includes means for storing information associated with the characters on said trading cards and for downloading said information to the video game control system, which includes means for receiving said downloaded information and which is capable of using said downloaded information and said associated character information from the trading cards to carry out the video game after the selected trading cards have been identified and the player's rights to use the selected trading cards have been verified.

2. A system of claim 1, wherein the trading cards include specialty cards which affect the characteristics of characters on the trading cards.

3. A system of claim 1, wherein the trading cards include specialty cards which result in a change of the rules of the video game.

4. A system of claim 1, wherein the trading cards include product cards which affect performance of a selected aspect of the video game.

5. A system of claim 4, wherein the selected aspect is a vehicle.

6. A system of claim 1, wherein the website has the capability of registering trading cards to a particular player.

7. A system of claim 1, wherein selected trading cards have a unique identifier associated with an owner of said selected trading cards.

8. A system of claim 1, wherein the website is accessible by players to permit acquisition of additional trading cards for the video game.

9. A system of claim 8, wherein the acquisition is a right to temporarily use a selected trading card for the video game being played.

10. A system of claim 1, wherein the video game system is adapted so as to permit a change of rules of the video game during the playing of the game when a player plays a trading card affecting such rules during the playing of the game.

11. A system of claim 1, wherein the video game accepts replica trading cards from a player and wherein the website includes processing means for verifying the ownership of an associated genuine trading card for a player using a replica trading card in the video game.

12. A system of claim 1, wherein the identification system is a scanner for the trading cards.

13. A system of claim 12, wherein the scanner is combined with the electronic game system in a single unit.

14. A system of claim 1, wherein the video screen is combined with the electronic game system in a single unit.

15. A system of claim 1, wherein the control system is located at the website.

16. A system of claim 1, wherein the electronic game system, the video screen and the control system are contained in a cell phone.

17. A system of claim 1, wherein the electronic game system, the video screen and the control system are contained in a personal computer.

18. A system of claim 1, wherein the website includes means for displaying selected individual trading cards or groups of trading cards.

19. A system of claim 1, wherein the trading cards have an identifier associated therewith.

20. A system of claim 19, wherein the identifier is a bar code.

21. A system of claim 19, wherein the identifier is positioned on the trading card.

22. A system of claim 19, wherein the identifier is positioned on a container for the trading card.

\* \* \* \* \*